(12) United States Patent
Barcelo Llado (10) Patent No.: US 11,438,256 B1
(45) Date of Patent: Sep. 6, 2022

(54) NETWORK ROUTING TABLES GENERATED BASED ON PRICING INFORMATION

(71) Applicant: Amazon Technologies, Inc., Seattle, WA (US)

(72) Inventor: Joan Enric Barcelo Llado, Zegland (AU)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 16/803,727

(22) Filed: Feb. 27, 2020

(51) Int. Cl.
| | |
|---|---|
| *H04L 12/66* | (2006.01) |
| *H04L 45/12* | (2022.01) |
| *H04L 45/00* | (2022.01) |
| *H04L 49/25* | (2022.01) |
| *H04L 45/02* | (2022.01) |
| *H04L 67/53* | (2022.01) |
| *H04L 47/12* | (2022.01) |
| *H04L 67/10* | (2022.01) |

(52) U.S. Cl.
CPC ............ *H04L 45/123* (2013.01); *H04L 45/02* (2013.01); *H04L 45/54* (2013.01); *H04L 47/12* (2013.01); *H04L 49/25* (2013.01); *H04L 67/10* (2013.01); *H04L 67/20* (2013.01); *H04L 12/66* (2013.01)

(58) Field of Classification Search
None
See application file for complete search history.

(56) References Cited

U.S. PATENT DOCUMENTS

| | | | |
|---|---|---|---|
| 8,677,016 B1* | 3/2014 | Jacobson | H04L 45/123 709/241 |
| 10,084,687 B1* | 9/2018 | Sharif | H04L 45/02 |
| 2008/0031236 A1* | 2/2008 | Yang | H04L 45/02 370/389 |
| 2010/0284287 A1* | 11/2010 | Venuto | H04W 40/08 370/252 |
| 2014/0313937 A1* | 10/2014 | Roper | H04L 45/02 370/255 |
| 2016/0134482 A1* | 5/2016 | Beshai | H04L 45/02 370/254 |
| 2016/0248658 A1* | 8/2016 | Patel | H04L 45/74 |
| 2017/0222914 A1* | 8/2017 | Fedyk | H04L 45/22 |
| 2018/0097725 A1* | 4/2018 | Wood | H04L 45/42 |
| 2019/0372886 A1* | 12/2019 | Beck | H04L 45/22 |
| 2020/0177494 A1* | 6/2020 | Franzen | H04L 45/586 |

* cited by examiner

*Primary Examiner* — Ajit Patel
(74) *Attorney, Agent, or Firm* — Klarquist Sparkman, LLP (57) ABSTRACT

In a border network having a plurality of routers, routing tables for the routers can be generated using one or more weighted parameters, such as a price associated with transmission of packets over third-party routers, capacity of the border routers, and performance information (e.g., latency) of the border routers. The routing tables can be repetitively generated to proactively ensure that the border network is operating optimally. The framework described augments a control plane with Availability, Performance, and Cost (APC) telemetry collected from existing services in a cloud environment. Such telemetry can be continuously correlated in a convex optimization framework to maintain the network in its optimal state. As a result, the framework can proactively avoid potential network degradation events (e.g. congestion) and the resulting customer impact, while reducing the cost of routing traffic through upstream peers/transits.

9 Claims, 7 Drawing Sheets

NETWORK ROUTING TABLES GENERATED BASED ON PRICING INFORMATION

BACKGROUND

Generally described, communication networks transmit information from one location to another through routing devices. These routing devices employ routing protocols when transmitting data from one point to another. For example, a group of routing devices may use a common routing protocol to exchange routing information, such as the connectivity between different routing devices or the number of routing devices in a given routing path. The routing devices then use this routing information to determine what path should be used in transmitting data from one location to another, i.e., what routing devices should be used.

Routing protocols include interior gateway protocols or "IGPs" as well as exterior gateway protocols or "EGPs." IGPs include the Open Shortest Path First ("OSPF") and Intermediate System to Intermediate System ("IS-IS") protocols. One exemplary EGP is the Border Gateway Protocol ("BGP"). IGPs often are used to communicate within a grouping of routing devices, such as an autonomous system ("AS"). EGPs often are used to communicate between different groupings of routing devices, such as multiple different Autonomous Systems (AS).

Transmission of data from one location to another may involve a number of different routing devices and a number of different routing protocols. For example, data may pass through several routing devices that communicate over a first OSPF network within a first AS and then through several other routing devices that communicate over a second OSPF network within a second AS. In this scenario, the first and second AS may communicate with each other using BGP over the Internet. At an edge of the AS, a border network is used to connect the AS to the Internet and typically uses third-party routers coupled to routers of, for example, a cloud provider or other network owner. Updating routing tables in the border network has added complications due to the connection to third-party routers that are not within the cloud provider or other network owner.

DETAILED DESCRIPTION

Communication between different autonomous systems is accomplished in a border network. Typically, border networks are configured to be reactionary to network events. For example, routers in the border network can transmit alerts (e.g., capacity or latency) to a control plane that receives the alerts and provides corrective action, such as having a network administrator attend to the router. However, waiting for an alert to occur typically means that packets have already been lost and will continue to be lost until the correction is made. Rather than wait for alerts to occur, a routing table update server can analyze one or more weighted parameters, such as a price associated with transmission over third-party routers, a capacity of the border routers, and performance information (e.g., latency) of the border routers. Using these weighted parameters, a routing table for the border routers can be generated at regular intervals and updated in the border routers. By continuously updating the routing tables in the border routers, potential problems can be corrected before occurring.

Thus, the system described augments a control plane provided by BGP with Availability, Performance and Cost (APC) telemetry collected from existing services in a cloud environment. Such telemetry can be continuously correlated in a convex optimization framework to maintain the network in its optimal state. Other optimizations can also be used, such as a non-convex optimization, machine learning, constraint programming and heuristics. As a result, the framework can proactively avoid potential network degradation events (e.g. congestion or performance impairments) and the resulting user impact, while reducing the cost of routing traffic through upstream peers/transits.

Figure 1:
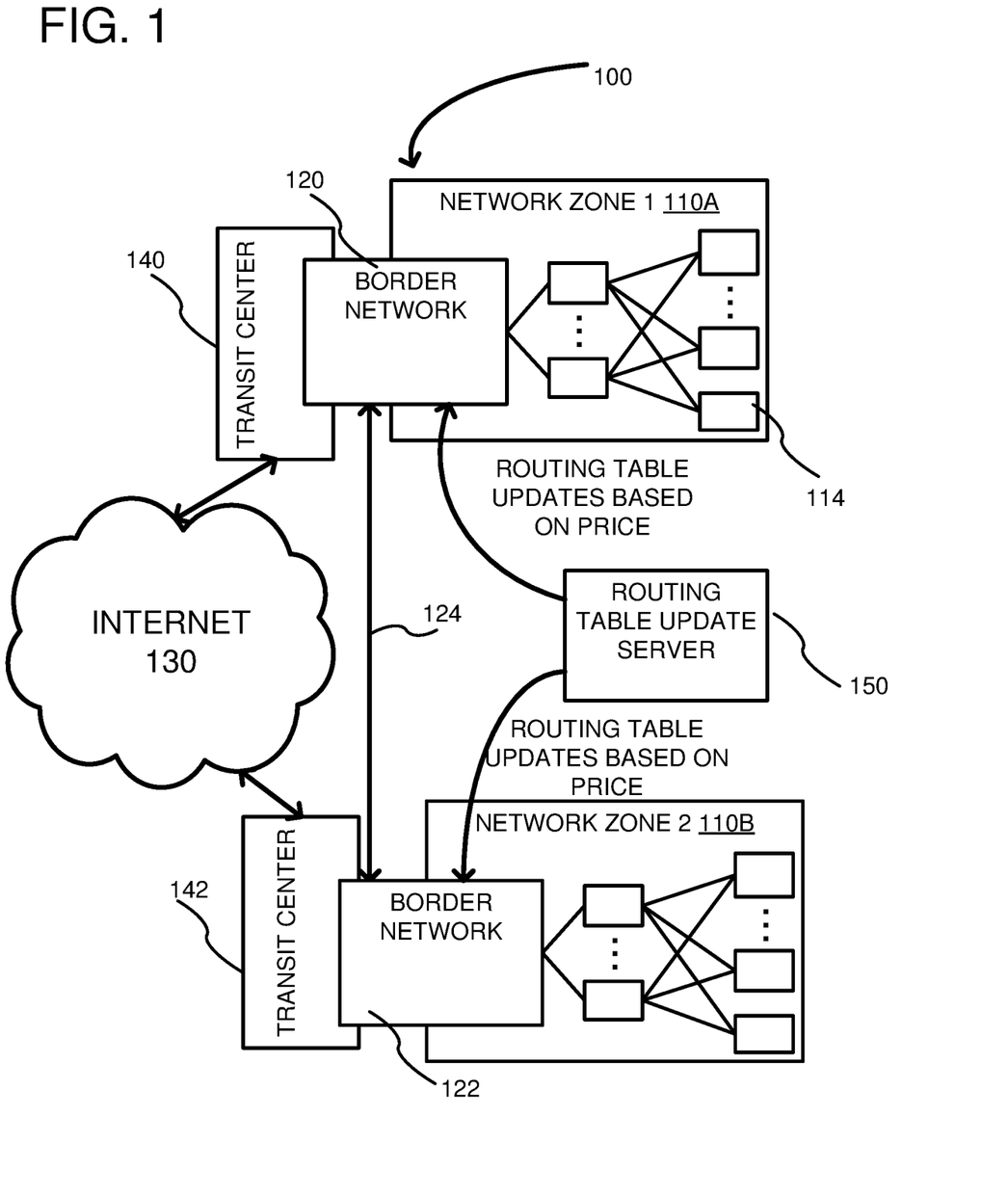
FIG. 1 is a system including multiple autonomous systems coupled together through the Internet, with a routing table update server for updating routers within a border network using pricing information in order to generate a routing table.

FIG. 1 is an exemplary system diagram illustrating a system 100 for updating routing tables in a border network. The system 100 includes a plurality of network zones 110A-110B coupled together. Although only two network zones 110A-110B are shown, there are typically many additional network zones coupled together to form a network. Additionally, although not shown, there are typically intermediate network devices between the network zones 110. In any of the examples described herein, a network zone can be a group of networked computing devices (such as routers) that can be identified as an origin for one or more network address prefixes. As an origin for a network address prefix, a network zone can be regarded by routers in the network as an ultimate destination for data packets destined for network addresses that begin with the network address prefix. Example network address prefixes include IP address prefixes, routing masks, subnet masks, etc. Example network zones include separate availability zones, data centers, subnets, border gateway protocol (BGP) autonomous systems, etc. In practice, any group of networked computing devices that can be identified as a destination for a given network address prefix can be a network zone. One or more computing devices in a network zone can generate routing protocol messages that are transmitted through a computer network and/or between computer networks. The generated routing protocol messages can identify routes through the computer network that can be used by routers in the network to transmit data packets towards computing devices in the network zone. Typically, the computing devices within the network zone all have a same policy applied by an administrator of the network zone. An example computing device is shown at 114 and can be coupled to a network within the network zone 110, such as a CLOS network.

Each network zone 110A-B includes a border network 120, 122. The border networks 120, 122 can be coupled together as shown at 124. In any of the examples described herein, a border network 120, 122 includes multiple routers configured to provide a point of entry for a given network zone. Such routers in the border network are sometimes called edge routers. Thus, for example, an edge router is an Internet Protocol (IP) router that forwards packets between autonomous systems using BGP. The border network 120, 122 can be configured to route data packets received from computing devices external to the network zone to computing devices within the network zone. The border network 120, 122 can also be configured to route data packets received from computing devices internal to the network zone to computing devices external to the network zone, such as through the Internet 130. A router that is external to the network zone can be referred to as a non-zone router. An edge router can be configured to transmit route advertisement messages (such as BGP UPDATE messages, or the like) to external routers that identify network address prefixes for which the edge router can act as a next hop in the routing of data transmissions.

Routers of the border networks 120, 122 can be housed in transit centers 140, 142. The transit centers 140, 142 can be physical buildings that allow third-party routers to connect to routers of a cloud provider. The transit centers 140, 142 can be coupled together through the Internet 130. The third-party routers can include a variety of different peering types, including, but not limited to, Public Network Interfaces (PNI), transit providers, and Internet Exchange providers. Third-party routers typically cost money to use and a cloud provider can have contractual arrangements with the third-party providers in order to transmit packets through the third-party routers.

In any of the examples described herein, a network computing device or, more simply, network device is any device that includes input/output ports and is configured to route packets there through. Example network devices include routers, switches, bridges, etc. A router can be a computing device configured to receive and forward data packets within a computer network and/or between computer networks. In at least some embodiments, a router can be referred to as a switch. The router can be configured to create and maintain a routing table based on routing protocol messages received via one or more communication networks. The router can comprise multiple communication ports connected to other routers (and/or other types of computing devices). The router can be configured to receive data packets from other routers (and/or other computing devices) via the one or more of the communication ports. The router can use data contained in the data packets and the routing table to identify next hop routers (and/or other computing devices) for the data packets and to transmit the data packets to the identified next hops via one or more of the communication ports.

A routing table update server 150 can be controlled by the cloud provider and programmed to generate routing tables to update routers in the border networks 120, 122. As further described below, the generation of the routing tables for the border networks 120, 122 can include using the contractual price associated with the third-party providers of routers. For example, the contractual price can be used as a factor in deciding where to route packets by balancing price, performance, and capacity information.

Figure 2:
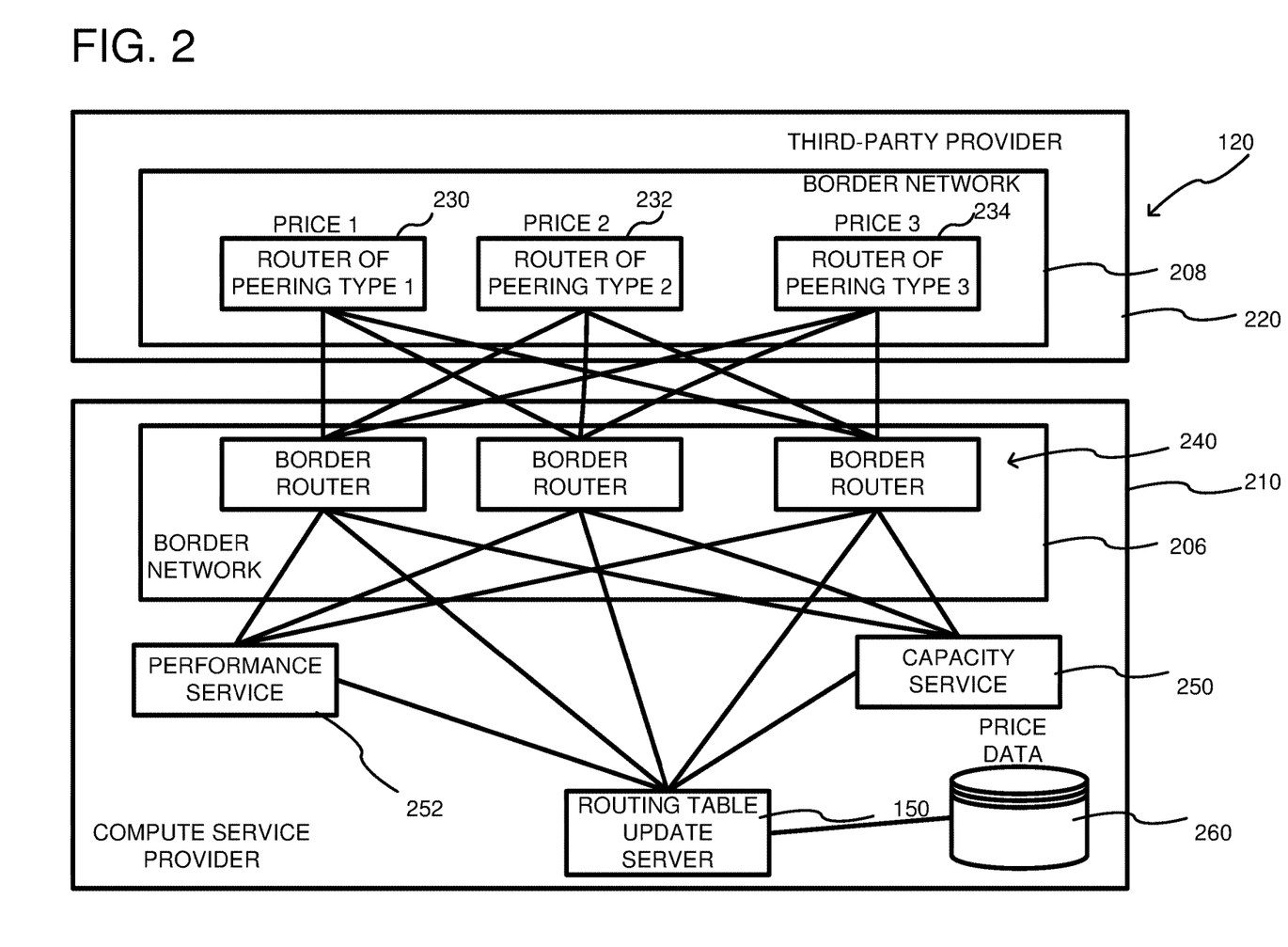
FIG. 2 shows a border network as including routers from a compute server provider and third-party routers that have different usage prices.

FIG. 2 shows further details of the structure of FIG. 1. The border network 120 can include be formed from two separate parts including a border network 206 and a border network 208. The border network part 206 includes routers controlled by a compute service provider, as shown by box 210, and the border network part 208 includes routers controlled by third-party providers, as shown by box 220. The routers 220 controlled by third-party providers can be of different peering types. For example, a router 230 can be a first peering type, such as a PNI, and can have a first price associated therewith for transmitting packets via the router 230. Router 232 can be a second peering type, such as an Internet Exchange type router, having a second price associated therewith for transmitting packets. Router 234 can be yet a third routing type, such as a transit provider, and has a third price associated therewith for transmitting packets. Other peering types and prices can be used, or multiple routers can be a same peering type and price.

The compute service provider 210 has control over its own border routers, shown generally at 240. By way of background, the compute service provider (i.e., a cloud provider) is capable of delivery of computing and storage capacity as a service to a community of end recipients. In an example embodiment, the compute service provider can be established for an organization by or on behalf of the organization. That is, the compute service provider may offer a "private cloud environment." In another embodiment, the compute service provider supports a multi-tenant environment, wherein a plurality of customers operate independently (i.e., a public cloud environment). Generally speaking, the compute service provider can provide the following models: Infrastructure as a Service ("IaaS"), Platform as a Service ("PaaS"), and/or Software as a Service ("SaaS"). Other models can be provided. For the IaaS model, the compute service provider can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider using networked client devices, such as desktop computers, laptops, tablets, smartphones, etc. running web browsers or other lightweight client applications. Those skilled in the art will recognize that the compute service provider can be described as a "cloud" environment.

The routing table update server 150 is shown coupled to the border routers 240 and provides updates to routing tables stored in the border routers, as further described below. The routing table update server 150 operates as a controller and can receive input metrics from other compute service provider services, such as a capacity service 250 and a performance service 252. The controller can be within a data center or operating outside of a data center. The capacity service 250, which runs on one or more server computers, can communicate directly with the border routers 240 to obtain current capacity of each individual border router. For example, the border routers 240 can measure ingress and egress buffers to determine how close the buffers are to full, meaning packet loss is imminent. Such buffer-level information can be transmitted to the capacity service 250. The capacity service 250 can then inform the routing table update server 150, which can use the capacity information as a weight in generating the routing tables for any individual border routers 240. Likewise, the performance service 252, which executes on one or more server computers, can measure metrics, such as latency or jitter. In one example, the performance service 252 can request customers to provide measured latency information, which may have been obtained through test packets. Like the capacity service data, the routing table update server 150 can receive the performance metrics from the performance service 252 and use the performance metrics in computing the routing tables for the border routers 240. The routing table update server 150 can further read pricing data from a database 260. The pricing data can relate to contract prices for using the third-party provider routers 220. Using the various information, the routing table update server 150 can compute the routing tables for each border router 240. Additional parameters can be used, such as the peering type. Thus, routing table generation can use weights associated with performance, price, capacity and/or peering type in order to generate the routing tables used in the border router.

Figure 3:
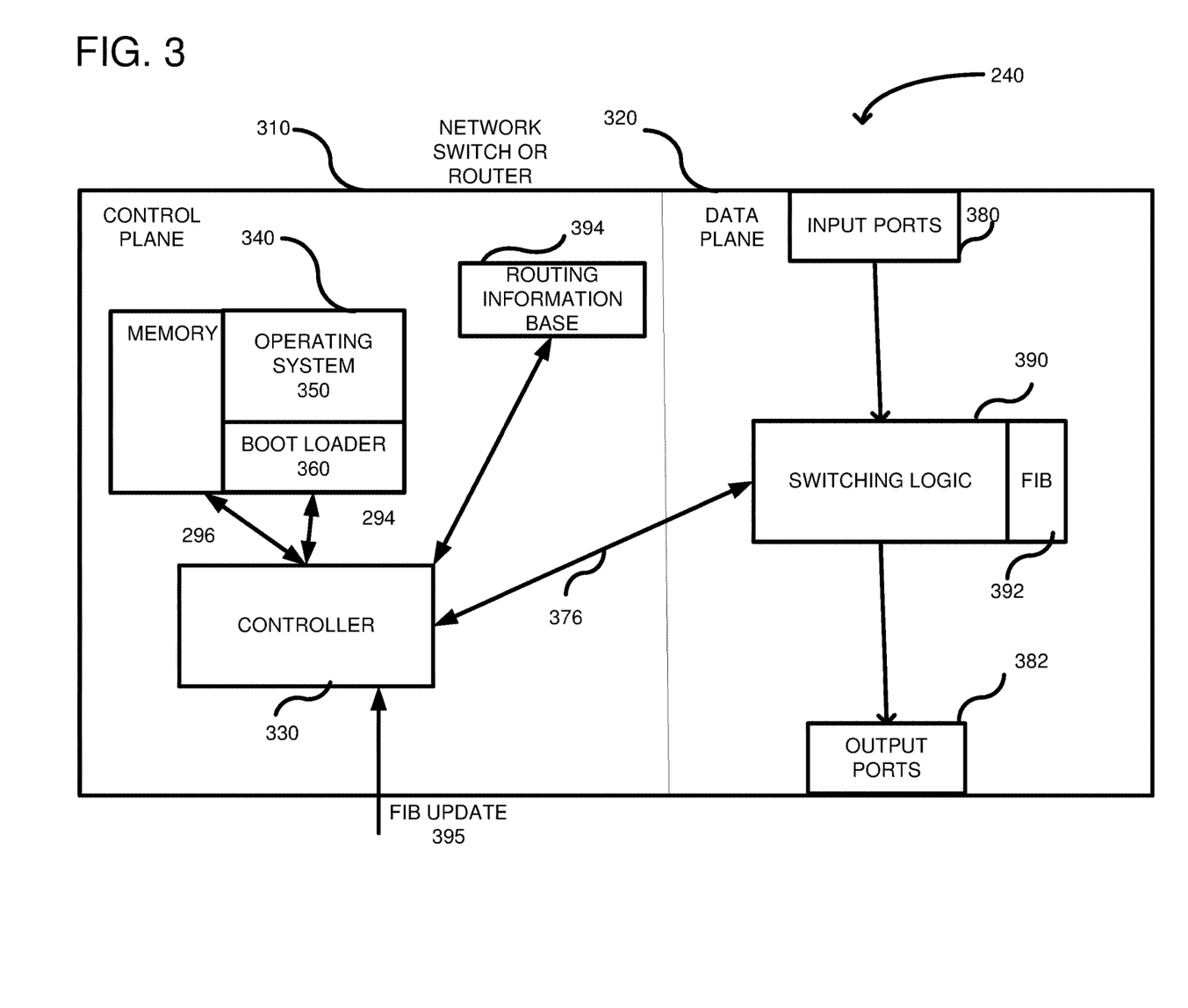
FIG. 3 is an example of implementation details of a router within a border network that stores the routing table.

FIG. 3 is an embodiment of a border router that is used for forwarding packets to neighbor routers. It should be understood that any network device can be used in place of the border router. The border router 240 includes a control plane 310 and a data plane 320. The control plane 310 is generally a management layer for configuring, updating, and controlling the data plane 320. The control plane includes a controller 330, which can be a Central Processing Unit (CPU), processor, application-specific integrated circuit (ASIC), microcontroller, or any hardware logic that can receive packets and provide switch management and control in response thereto. The controller 330 has access to a memory 340 that can be a Dynamic Random Access Memory (DRAM), Flash memory, or other type of RAM or ROM. The memory 340 is used to store an operating system 350 and a boot loader program 360, which is a first program executed after a reboot of the controller 330. Although a single memory is shown, the memory 340 can be divided into multiple memories and even memories of different types. A communications bus 376 allows communications between the controller 330 and the data plane 320. The communications bus 376 can be any desired bus type, such as PCI, PCIe, AGP, etc. The data plane 320 includes input port 380 and output port 382 used for receiving and sending network packets, respectively. Switching logic 390 is positioned intermediate the input and output ports. The switching logic 390 includes hardware for switching in accordance with layer 2, layer 3 or both. The switching logic 390 can include a routing table, which in this case is a forwarding information base (FIB 392). The FIB 392 can be programmed by the controller 330 to ensure packets are switched to the proper output port 382.

The control plane 310 further includes a routing information base (RIB) 394, which stores prefix information for network devices on the network. As shown at 395, the controller 330 can receive an update message that includes prefix and associated port information used to program the switching logic 390. The controller 330 can execute regular updates to program the FIB 392 using data within the RIB 394.

Figure 4:
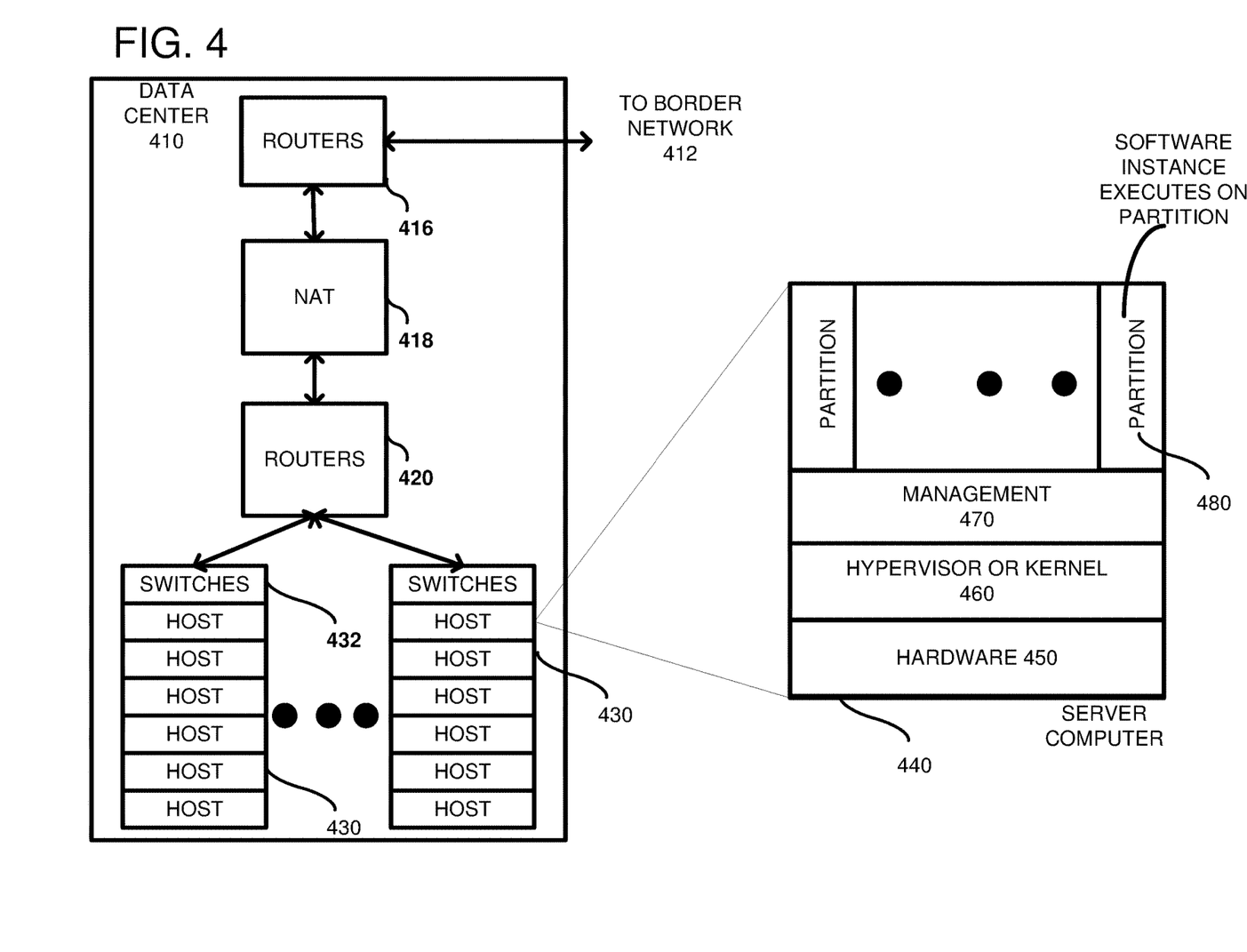
FIG. 4 is an example data center within the compute service provider that transmits packets through the border network.

FIG. 4 illustrates a data center 410 coupled together by routers 416. The routers 416 read address information in a received packet and determine the packet's destination. If the router decides that the packet is bound for a border network, then the packet is forwarded to that border network as indicated at 412. If the packet is addressed to a host in the data center 410, then it is passed to a network address translator (NAT) 418 that converts the packet's public IP address to a private IP address. The NAT also translates private addresses to public addresses that are bound outside of the datacenter 410. Additional routers 420 can be coupled to the NAT to route packets to one or more racks of host server computers 430. Each rack 430 can include a switch 432 coupled to multiple host server computers. A particular host server computer is shown in an expanded view at 440.

Each host 440 has underlying hardware 450 including one or more CPUs, memory, storage devices, etc. Running a layer above the hardware 450 is a hypervisor or kernel layer 460. The hypervisor or kernel layer can be classified as a type 1 or type 2 hypervisor. A type 1 hypervisor runs directly on the host hardware 450 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 670 can be part of the hypervisor or separated therefrom and generally includes device drivers needed for accessing the hardware 450. The partitions 480 are logical units of isolation by the hypervisor. Each partition 480 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 470, which can then pass the metrics to the performance service 252 or capacity service 250 (FIG. 2). Additionally, the management layer 470 can pass metrics related to the number of instances that are running, when they were launched, the operating system being used, the applications being run, etc. All such metrics can be used for consumption by the aforementioned services.

Figure 5:
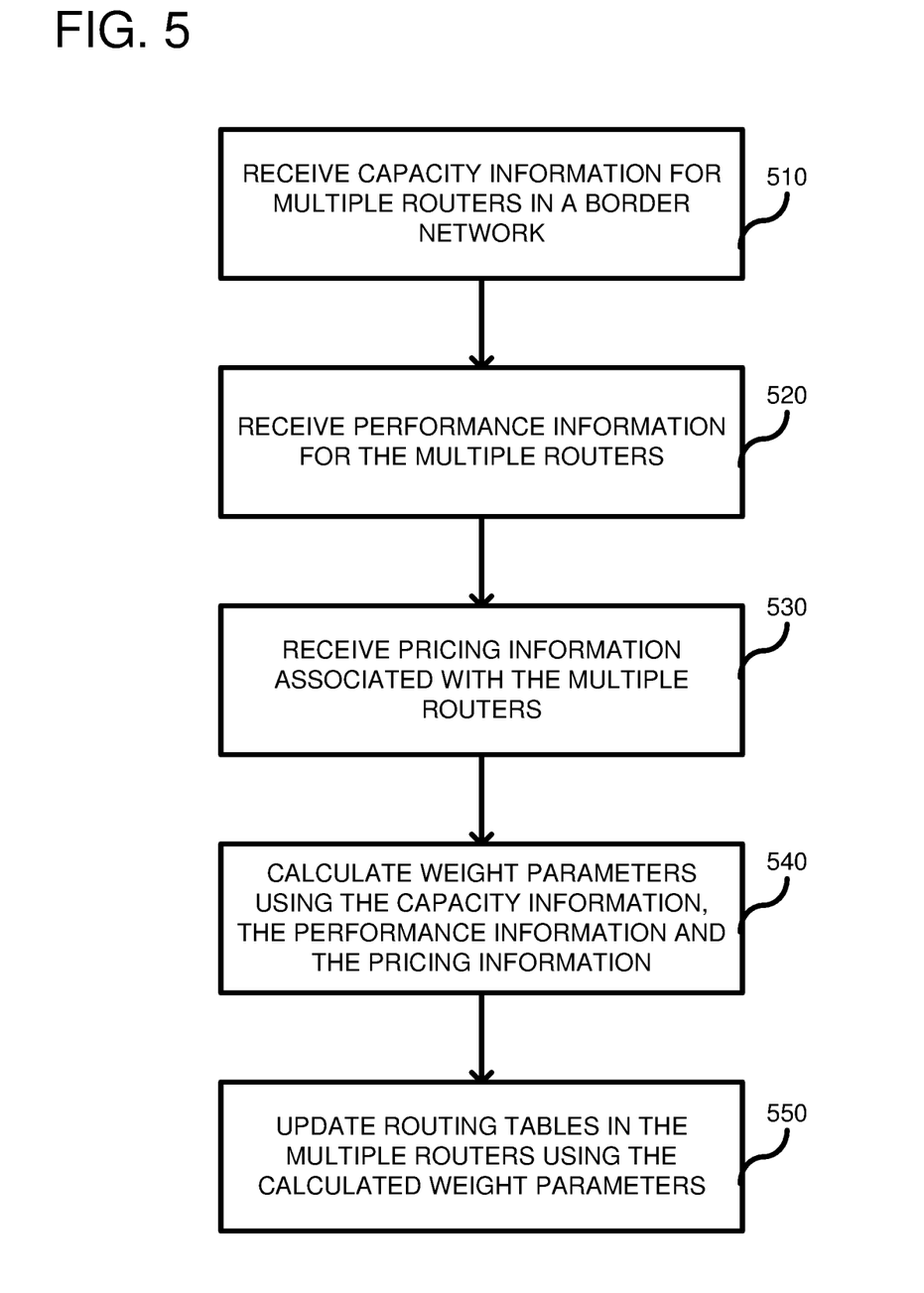
FIG. 5 is a flowchart according to one embodiment for updating routing tables in the border network using pricing information.

FIG. 5 is a flowchart according to one embodiment for updating routing tables used in a border network. In process block 510, capacity information is received for multiple routers in a border network. For example, in FIG. 2, the capacity service 250 can be used to transmit capacity metrics to the routing table update server 150. The capacity metrics can relate to capacity, availability or other metrics associated with bandwidth. In process block 520, performance information can be received related to the multiple routers. Returning to FIG. 2, the performance service 252 can receive latency metrics, jitter metrics, or other metrics relating to performance of the routers. The performance metrics can then be passed to the routing table update server 150. In process block 530, pricing information is received. For example, the routing table update server 150 can receive price data from the database 260. The pricing data can relate to the prices associated with using the third-party routers 220 (FIG. 2) of different peering types. Such pricing, for example, can be input by an administrator once the price is set. In process block 540, weight parameters can be calculated using the capacity information, the performance information and the pricing information. In process block 560, the routing table update server 540 can then update the routing tables using the calculated weight parameters. There are numerous techniques for updating the routing tables. The following discusses one embodiment for calculating the routing tables using weighting information.

The following definitions relate to using pricing information to generate a routing table:

P—Denotes the number of prefixes considered for optimization.

R—Denotes the number of resources or peers considered for optimization. A resource is composed by the set of interfaces towards the same peer.

p—Denotes the traffic per prefix. $p \in \mathbb{R}^P$. $[p]_i$ denotes the traffic volume of the ith prefix.

u—Denotes the utilization per resource. $u \in \mathbb{R}^R$. $[u]_i \in [0, 1]$ denotes the utilization allocated to the ith resource.

$u_{init}$—Denotes the utilization level per resource before optimization.

c—Denotes the total capacity per resource. $c \in \mathbb{R}^P$. $[c]_i$ denotes the total capacity of the ith resource.

$w_{price}$—Denotes the contractual price per resource.

$w_{type}$—Encodes the peer type of the resource. w—Denotes the weight associated per resource. $w = \alpha_{price} w_{price} + \alpha_{type} w_{type}$. Where $\alpha_{price}$ and $\alpha_{price}$ are the scalar weights associated to the price and the peering type. W can also be based solely on price.

A—Denotes whether a given prefix is routable via a given resource. $A \in \mathbb{R}^{P \times R}$. In particular, $[A]_{i,j} \in \{0, 1\}$.

S—Denotes a performance score matrix that denotes the performance score for a given prefix when it is routed via a given peer. $S \in R^{P \times R}$. In particular $[S]_{ij} \in [0,1]$. When $[S]_{ij}=0$, the ith Peer is not routable over the jth peer.

X—Denotes whether a given prefix has been allocated to a given resource. $X \in \mathbb{R}^{P \times R}$. In particular, $[X]_{i,j} \in \{0, 1\}$.

Matrix Notation examples are as follows:

An availability Matrix A can be understood using the following example (the prefixes are shown generically as including only 9's):

$$A = \begin{bmatrix} 1 & 1 & \cdots & 0 \\ 1 & 0 & \cdots & 1 \\ \vdots & \vdots & \ddots & \vdots \\ 0 & 0 & \cdots & 0 \end{bmatrix} \begin{matrix} \overbrace{\text{Co.1 Co.2 } \cdots \text{ Co.3}}^{\text{Resources}} \\ \begin{bmatrix} 99.999.999.9/99 \\ 99.999.999.9/99 \\ \vdots \\ 99.999.999.9/99 \end{bmatrix} \end{matrix} \text{—Prefixes}$$

In order to signal that a prefix e.g., Sprint, is able to route the prefix 99.198.128.0/17, the element (1, 1) of A (denoted as $[A]_{1,1}$) is set to 1. Furthermore, $[A]_{2,2}=0$ denotes that the prefix 23.228.128.0/18 is not routable through Google.

The Routing Allocation Matrix X:

$$X = \begin{bmatrix} 0 & 1 & \cdots & 0 \\ 0 & 0 & \cdots & 1 \\ \vdots & \vdots & \ddots & \vdots \\ 0 & 0 & \cdots & 0 \end{bmatrix} \begin{matrix} \overbrace{\text{Co.1 Co.2 } \cdots \text{ Co.3}}^{\text{Resources}} \\ \begin{bmatrix} 99.999.999.9/99 \\ 99.999.999.9/99 \\ \vdots \\ 99.999.999.9/99 \end{bmatrix} \end{matrix} \text{—Prefixes}$$

In order to signal that a prefix e.g., 99.198.128.0/17 is active and routed through the Google peering, the element (1, 2) of X (denoted as $[X]_{1,2}$) is set to 1. Furthermore, $[X]_{2,1}=0$ denotes that the prefix 23.228.128.0/18 has not been allocated to Spring even though it is routable. This behavior is captured as an optimization constraint. Thus, matrices can be formed using resources vs prefixes.

One prefix can be allocated to one provider at a time. In other words:

$$\sum_{i=1}^{R} [X]_{i,j} = 1.$$

Furthermore, it is easy to observe that all the zero-entries of A correspond element-wise to zeroes in X. Otherwise, some prefixes can be sent to interfaces that do not advertise those prefixes. Also, because the multiple allocation is not permitted, the total amount of 1's in X should be equal to the number of prefixes. More formally:

$$\sum_{i,j} [X]_{i,j} = P.$$

Hence, the element-wise multiplication between X and A should honor:

$$\sum_{i,j} [A \odot X]_{i,j} = P.$$

where $\odot$ denotes the element-wise multiplication between two matrices. This can be reformulated as follows:

$$\sum_{i,j} [A \odot X]_{i,j} = \sum_{i,j} [A]_{i,j} [X]_{i,j} = Tr(A^T X).$$

Hence, the property $Tr(A^T=P$ is captured as an optimization constraint.

Convex Optimization Formulation is as follows:

The utilization cost function can be defined as follows: g: $g: \mathbb{R}^N \to \mathbb{R}^N$ as:

$$g(x) = \frac{1}{(1-x)^a}$$

This function can be applied over the link utilization vector u. In particular, the conservative corresponds to $\alpha=2$, the moderate corresponds to $\alpha=1$, and the aggressive corresponds to $\alpha=0.5$.

As a specific example, a network allocates an extra 10 units of traffic. This network is conformed of two links with current utilization $u=[0.4, 0.7]^T$. Due to link size, allocating this 10 units of traffic increases the link utilization of any of the two links by 10%. Using the proposed utilization cost function as a decision mechanism, moving traffic to link one increases $[u_1]$ from 0.4 to 0.5, hence it will result in a cost of $g(0.5)=2$ (assuming $\alpha=1$). Similarly, for the second link $g(0.8)=5$. Hence, the algorithm recommends moving traffic to the less congested link.

As another example, a network allocates an extra 20 units of traffic. This network is conformed of two links with current utilization $u=[0.5, 0.5]^T$. Due to link size, allocating the 20 units of traffic increases the link utilization of any of the two links by 20%. Assuming $\alpha=1$, moving traffic to any of the two links results in a global cost of 12 ($g(0.5)+g(0.9)=2+10$). However, moving half of the traffic to each link results in a better choice, with a cost of 6.6 ($g(0.7)+g$ (0.7)=3.3+3.3). This leads to a situation where no link is utilized over 90%, keeping the network in a more balanced state.

As illustrated by the examples above, applying the cost function penalizes high utilization links over less busy links. In order to expand the cost function with performance, a second term can be added as follows:

$$h(X) = Tr(S^T X)$$

This term represents the sum of performances over all prefixes for a given routing allocation matrix X.

Another beneficial property of these functions are that they are convex. Hence, they can be incorporated into a convex optimization formulation without breaking convexity.

The utilization vector u can be computed as:

$$u = C^{-1} Xp + u_{init},$$

where C=diag(c) is the diagonal matrix of capacities for every resource.

A feasible solution can satisfy the following set of constraints:

$$X \in \{0,1\},$$

$$\sum_{i=1}^{R} [X]_{i,j} = 1,$$

$$Tr(A^T X) = P,$$

$$u \in [0,1].$$

One of the constraints indicates that the prefix i is allocated entirely to resource j. Partial allocations are undesirable, e.g., prefix i allocates 20% of traffic to Transit j, and 80% to PNI k. Another constraint ensures that the prefix i is assigned to one and only one resource, so there is no double allocation. Yet another constraint ensures that all the prefixes have been allocated through routable resources. Still another constraint enforces capacity limits for all resources. For brevity, let $\mathcal{C}$ denote the set of matrices $X \in \mathbb{R}^{F \times R}$ that satisfy the above equations. With this information, the optimization intention is defined as follows:

$$X^* = \underset{x}{\text{minimize}} \quad w^T g(u) - h(X)$$
$$\text{subject to} \quad X \in C'.$$

where, $w^T g(u)$ computes the weighted sum of the utilization cost function. The weighting vector w takes into account the contractual price of the peering session, peering type and any other potential resource attribute that may affect to prioritize one resource over another.

In order to keep the convexity properties, one of the constraints is relaxed as:

$$X \in [0,1].$$

This defines a new set of constraints such that C' denotes the set of $X \in \mathbb{R}^{F \times R}$. Thus, the new minimization program results in:

$$X^* = \underset{x}{\text{minimize}} \quad w^T g(u) - h(X)$$
$$\text{subject to} \quad X \in C'.$$

This constraint relaxation produces, however, that the elements of X* are non-binary. In other words, a given prefix can be attributed to multiple peers simultaneously, e.g., prefix i allocates 20% of traffic to Transit j, and 80% to PNI k.

In order to address the non-binary allocation issue, an iterative heuristic. The heuristic starts with a minimization of one of the constraints. As expected, this resolves in non-binary entries of the optimal allocation matrix X*. Therefore, for a given prefix allocation $[X^*]_i$, the resource j* with less traffic allocated is found. The intuition behind this is straightforward; if the optimal allocation only assigns a small fraction of the traffic of this prefix to this resource, it is reasonable to assume that this may be the least preferred resource for this given prefix. In order to enforce the allocation of prefix i onto resource j* to be zero during the next iteration, i is made unreachable on resource i. This is done by forcing 0 on i,j* index of the reachability matrix A. Finally, this process is repeated until all elements in X are binary.

| Algorithm 1 Dynamic Routing Optimiser algorithm |
|---|
| 1: procedure ROUTEOPTIMISATION(A, S, p, w, $u_{init}$) |
| 2:    repeat |
| 3:       X* ← runMinimisation       ▷ The convex optimisation above. <br>       (A, S, p, w, $u_{init}$) |
| 4:       for every ith prefix in P do |
| 5:          $j^* \leftarrow \underset{argmin}{j} [X]_{i,j}, \forall [X]_i > 0$   ▷ Get index of smallest non-zero allocation of prefix i. |
| 6:          $[A]_{i,j^*} \leftarrow 0$       ▷ Forbid the small allocation from the availability matrix A. |
| 7:       end for |
| 8:    until $[X^*]_{i,j} \in \{0,1\}, \forall i, j$   ▷ The optimal solution X* should only contain binary values. |
| 9: end procedure |

Figure 6:
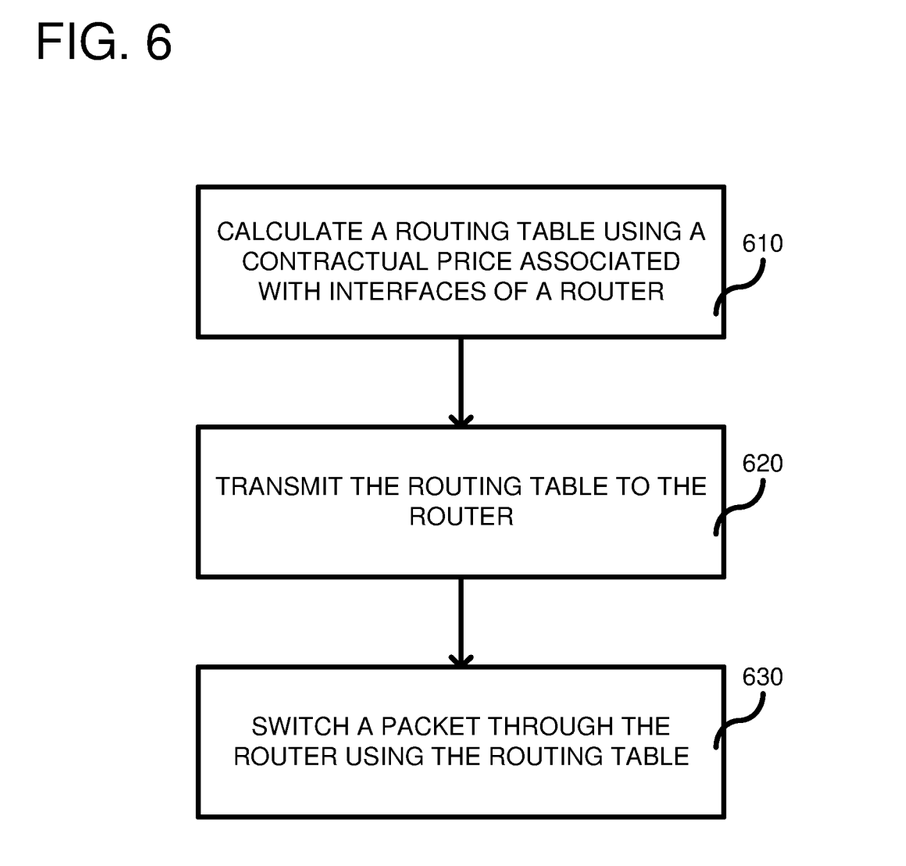
FIG. 6 is a flowchart according to another embodiment for updating routing tables in the border network using pricing information.

FIG. 6 is a flowchart according to another embodiment for generating a routing table. In process block 610, a routing table is calculated using a contractual price associated with interfaces of the router. For example, some interfaces are coupled to third-party routers of different peering types. Accordingly, transmitting over one interface can be more costly than transmitting over a different interface. FIG. 2 provides an example of the routing table update server 150 coupled to the database 260, which includes the pricing data for routers of the third-party providers 220. The routing table can be generated using a variety of techniques including using the pricing data as a weight in the optimization algorithm, as described above. In some embodiments, the method can further include calculating a weight using capacity and performance information. In still other embodiments, the peering type can be used as a weight in the optimization algorithm. Whatever technique is used, the weight can be calculated separately for each port on the router. In process block 620, the routing table is transmitted to the router. For example, in FIG. 3, the FIB update 395 is transmitted to the router 240. The controller 330 of the router can then load the routing table in the FIB 392 so that the router 240 is ready to switch packets. In process block 630, a packet is switched through the router using the routing table. For example, in FIG. 3, once the FIB 392 is loaded, packets on the input port 380 are switched by the switching logic 390 to the appropriate output port 382.

Figure 7:
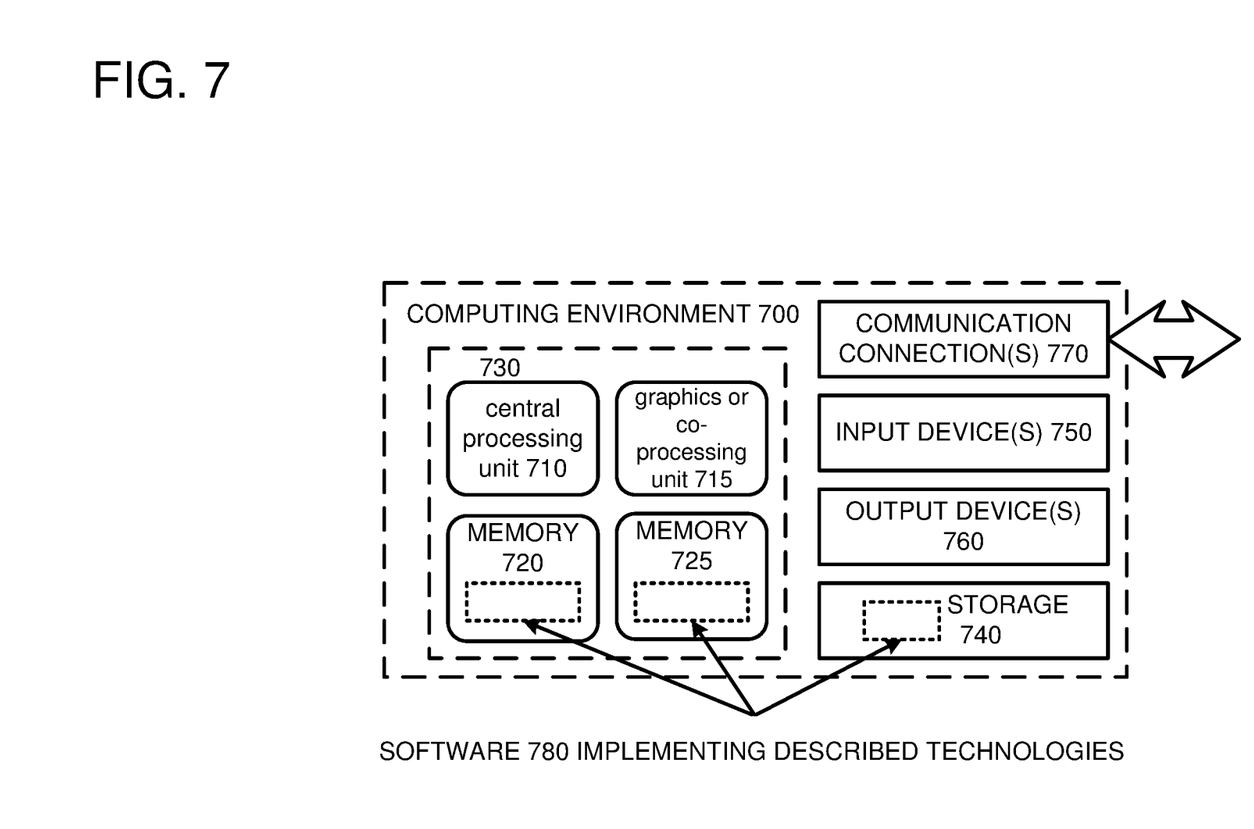
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). Aspects of FIG. 7 can be used in the routers, such as shown in FIG. 3, or to implement the routing table update server 150.

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method, comprising:
calculating, using a server computer in a compute service provider, a routing table using a price associated with ports of a router in a border network, wherein the price associated with the ports of the router relates to the price associated with transmitting a plurality of packets through the ports to third-party routers of different peering types that charge for use of the third-party routers based upon which peering type of the different peering types is used;
transmitting, by the compute service provider, the routing table to the router; and
switching a packet of the plurality of packets through the router using the routing table to select one of the ports of the router on which to transmit the packet to one of the third-party routers.

2. The method of claim 1, wherein the calculating includes using the price as a weight in an optimization algorithm.

3. The method of claim 2, further including calculating the weight using capacity information and performance information associated with the ports.

4. The method of claim 3, wherein the performance information includes a latency associated with the ports.

5. The method of claim 1, wherein the border network allows a cloud provider autonomous system (AS) to connect with another AS through an Internet network.

6. The method of claim 2, further including using a peering type associated with the ports of the router as a weight in the optimization algorithm.

7. The method of claim 6, wherein the peering type includes a Private Network Interconnect (PNI), an Internet Exchange, or a transit provider, which is one of the third-party routers coupled to the ports of the router.

8. The method of claim 1, wherein the weight is calculated separately for each port on the router.

9. The method of claim 1, wherein the border network includes multiple of the third-party routers coupled to the ports and the price is different for each of the multiple third-party routers.

\* \* \* \* \*